(12) United States Patent
Kitani et al.

(10) Patent No.: US 9,304,343 B2
(45) Date of Patent: Apr. 5, 2016

(54) LIQUID CRYSTAL DISPLAY DEVICE

(71) Applicant: Japan Display Inc., Tokyo (JP)

(72) Inventors: Masakatsu Kitani, Saitama-ken (JP); Jin Hirosawa, Saitama-ken (JP)

(73) Assignee: JAPAN DISPLAY INC., Tokyo (JP)

( * ) Notice: Subject to any disclaimer, the term of this patent is extended or adjusted under 35 U.S.C. 154(b) by 202 days.

(21) Appl. No.: 13/890,515

(22) Filed: May 9, 2013

(65) Prior Publication Data
US 2013/0300962 A1 Nov. 14, 2013

(30) Foreign Application Priority Data

May 11, 2012 (JP) ................................. 2012-109559

(51) Int. Cl.
*G02F 1/1343* (2006.01)
*G09G 3/36* (2006.01)
(Continued)

(52) U.S. Cl.
CPC ...... *G02F 1/13306* (2013.01); *G02F 1/134309* (2013.01); *G02F 1/136213* (2013.01);
(Continued)

(58) Field of Classification Search
CPC .................... G02F 1/136213; G02F 1/136286; G02F 1/1368; G02F 1/136227; G02F 1/134336; G02F 2001/134345; G02F 1/13624; G02F 1/1393; G02F 1/134309; G02F 2201/40; G02F 2001/136218; G02F 2001/134318; G02F 1/133753; G02F 1/136204; G02F 2001/134381; G02F 2201/121; G02F 2201/122; G02F 1/1343; G02F 1/134327; G02F 2201/123; H01L 27/1255; H01L 29/78633; H01L 29/42384; H01L 27/1251; G09G 3/3614; G09G 2300/0426; G09G 3/3659; G09G 2300/0876; G09G 2300/0447; G09G 3/3607; G09G 2300/0809; G09G 2300/0439; G09G 2300/0823; G09G 2300/043; G09G 3/2074; G09G 2320/0214; G09G 3/207
USPC ......... 349/139, 142, 146, 37–39, 43, 85, 143, 349/173
See application file for complete search history.

(56) References Cited

U.S. PATENT DOCUMENTS 6,266,116 B1 7/2001 Ohta et al.
8,159,429 B2 * 4/2012 Kim et al. ........................ 345/87
(Continued)

FOREIGN PATENT DOCUMENTS

JP 6-222397 8/1994
JP 6-273803 A 9/1994
(Continued)

OTHER PUBLICATIONS

Office Action issued Nov. 4, 2015 in Japanese Patent Application No. 2012-109559 (with English language translation).

*Primary Examiner* — Michael Caley
*Assistant Examiner* — Angela Davison
(74) *Attorney, Agent, or Firm* — Oblon, McClelland, Maier & Neustadt, L.L.P.

(57) ABSTRACT

A first substrate includes first and second gate lines extending in a first direction. First, second, and third source lines respectively extend in a second direction orthogonally crossing the first direction and crossing the first and second gate lines. A first pixel electrode is arranged adjoining the first source line and extends in the second direction. A second pixel electrode is arranged adjoining the third source line and extends in the second direction. A second substrate includes a common electrode arranged above the second source line extending in the second direction between the first source line and the third source line. The first and second source lines, the first and second gate lines, and the first pixel electrode form a first pixel, and the second and the third source lines, the first and second gate lines, and the second pixel electrode form a second pixel.

10 Claims, 7 Drawing Sheets

(51) Int. Cl.
    *G02F 1/133*      (2006.01)
    *G02F 1/1362*      (2006.01)
    *G02F 1/136*      (2006.01)

(52) U.S. Cl.
    CPC ............ G09G3/3614 (2013.01); G09G 3/3648 (2013.01); *G02F 1/1343* (2013.01); *G02F 1/134336* (2013.01); *G02F 2001/13606* (2013.01); *G02F 2001/134318* (2013.01); *G02F 2001/134381* (2013.01); *G02F 2001/136218* (2013.01); *G02F 2201/123* (2013.01); *G02F 2201/40* (2013.01); *G09G 2320/0209* (2013.01); *G09G 2330/06* (2013.01)

(56) References Cited

U.S. PATENT DOCUMENTS

| | | | |
|---|---|---|---|
| 2001/0010575 A1 | 8/2001 | Yoshida et al. | |
| 2002/0159015 A1 | 10/2002 | Seo et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1* | 5/2007 | Kim et al. | 345/90 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0225250 A1* | 9/2009 | Lyu et al. | 349/44 |
| 2010/0033645 A1* | 2/2010 | Nakagawa | 349/39 |
| 2012/0069280 A1* | 3/2012 | Hirosawa | 349/123 |

FOREIGN PATENT DOCUMENTS

| | | |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2001-91974 A | 4/2001 |
| JP | 2004-213031 A | 7/2004 |
| JP | 2005-3802 | 1/2005 |
| JP | 3644653 | 2/2005 |
| JP | 2005-242307 | 9/2005 |

* cited by examiner

LIQUID CRYSTAL DISPLAY DEVICE

CROSS-REFERENCE TO RELATED APPLICATION

This application is based upon and claims the benefit of priority from prior Japanese Patent Application No. 2012-109559 filed May 11, 2012, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first gate line and a second gate line extending in a first direction, a first source line, a second source line and a third source line respectively extending in a second direction orthogonally crossing the first direction and crossing the first and second gate lines, a first pixel electrode arranged adjoining the first source line and extending in the second direction, a second pixel electrode arranged adjoining the third source line and extending in the second direction, a second substrate including a common electrode arranged above the second source line extending in the second direction between the first source line and the third source line; and a liquid crystal layer held between the first substrate and the second substrate; wherein the first and second source lines, the first and second gate lines, and the first pixel electrode form a first pixel, and the second and the third source lines, the first and second gate lines, and the second pixel electrode form a second pixel.

Figure 1:
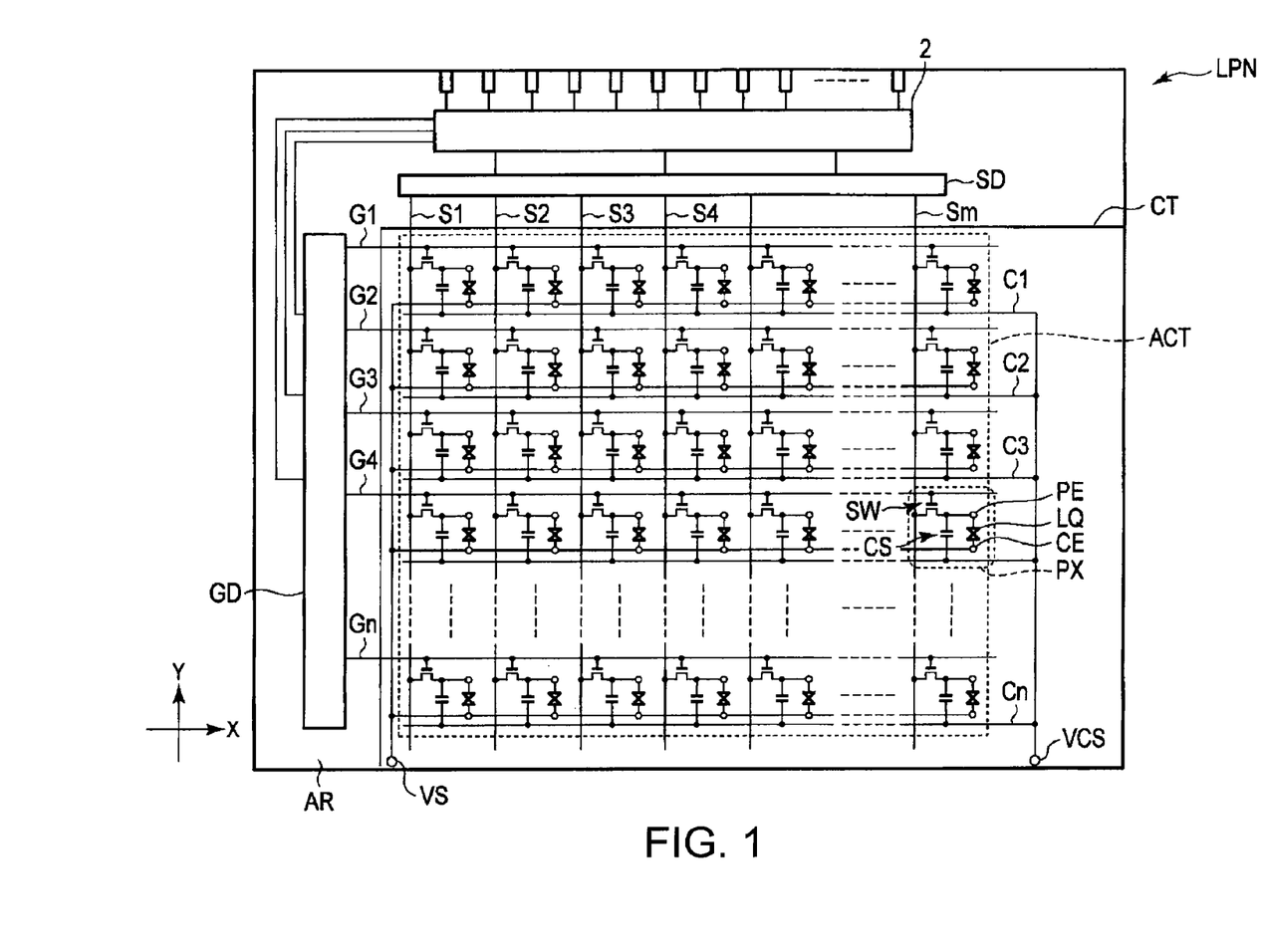
FIG. 1 is a figure schematically showing a structure and the equivalent circuit of a liquid crystal display device according to one embodiment.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X apart from each other. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to the outside of the active area ACT and connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and a semiconductor layer of the switching element SW. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least a portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to the principle surfaces of the substrates or a lateral electric field substantially in parallel with the principal surface of the array substrate AR or the counter substrate CT.

The switching element SW is constituted by an n channel type thin film transistor (TFT), for example. The switching element SW is electrically connected with the gate line G and the source line S. The switching element SW may be either a top-gated type or a bottom-gated type. Though the semiconductor layer is formed of poly-silicon, the semiconductor layer may be formed of amorphous silicon.

The pixel electrode PE is arranged in each pixel PX and electrically connected with the switching element SW. The common electrode CE of common potential is arranged in common to the plurality of pixel electrodes PE through the liquid crystal layer LQ. Though the pixel electrode PE and the common electrode CE are formed of light transmissive conductive materials such as Indium Tin Oxide (ITO), Indium Zinc Oxide (IZO), etc., other materials such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electrically conductive component which is not illustrated.

Figure 2A:
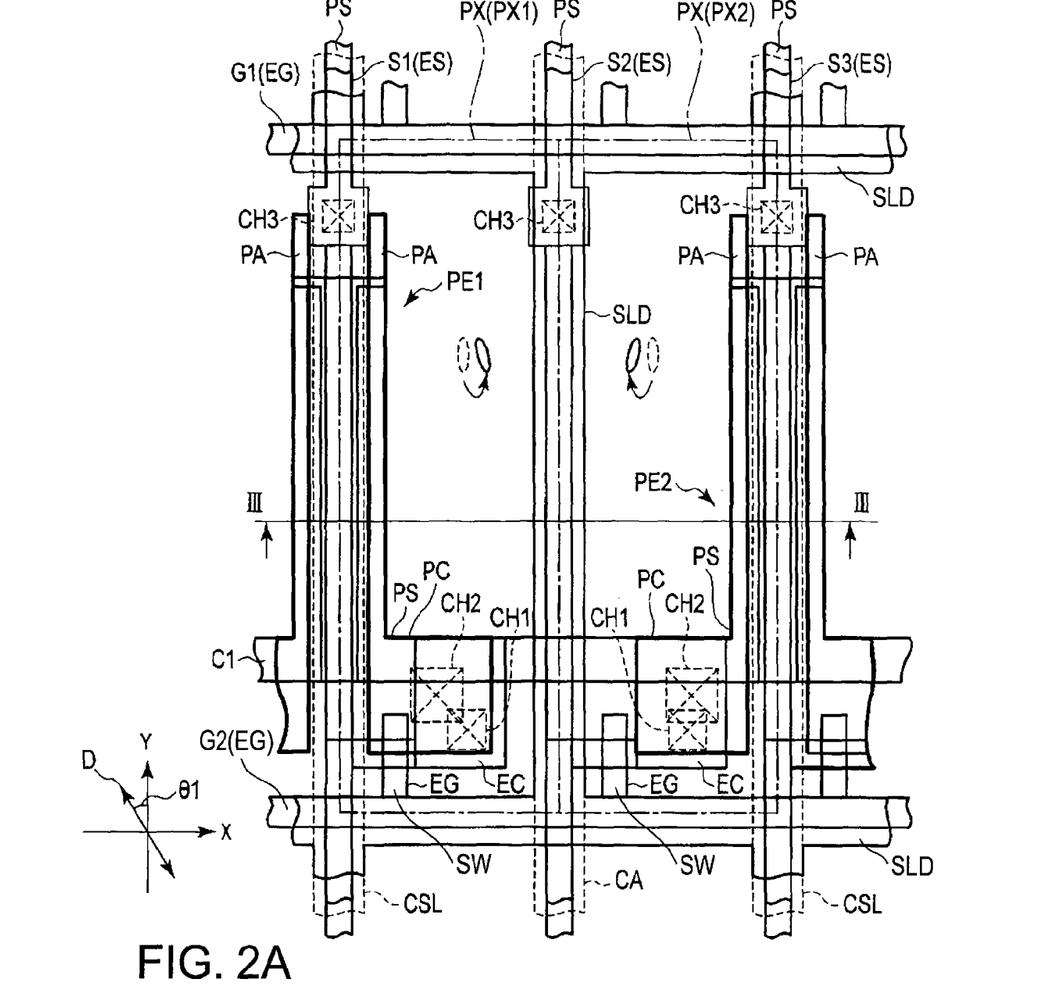
FIG. 2A is a plan view schematically showing a structure of two pixels arranged in a first direction when a display panel shown in FIG. 1 is seen from a counter substrate side according to a first embodiment.

FIG. 2A is a plan view schematically showing a structure of two pixels arranged in the first direction when the display panel shown in FIG. 1 is seen from a counter substrate side according to a first embodiment. Herein, a plan view in a X-Y plane is shown.

Each of the illustrated pixels PX has the shape of a rectangle whose length in the first direction X is shorter than the length in the second direction Y, as shown with a chain line. The gate line G1 and the gate line G2 extend along the first direction X. The source line S1 and the source line S3 extend along a second direction Y. The pixel electrode PE is arranged, respectively, between the adjoining source line S1 and source line S2, and between the adjoining source line S2 and source line S3. Moreover, the pixel electrode PE is arranged between the gate line G1 and the gate line G2.

In this embodiment, the pixel PX includes a first pixel PX1 in which a first pixel electrode PE1 is arranged, and a second pixel PX2 in which a second pixel electrode PE2 is arranged. The first pixel PX1 and the second pixel PX2 are arranged along the first direction X.

In the first pixel PX1, the source line S1 is arranged at the left-hand side end, and the source line S2 is arranged at the right-hand side end. Precisely, the source line S1 is arranged striding over a boundary between the first pixel PX1 and an adjoining pixel PX on its left-hand side, and the source line S2 is arranged striding over a boundary between the first pixel PX1 and the adjoining second pixel PX2 on its right-hand side.

In the second pixel PX2, the source line S2 is arranged at the left-hand side end, and the source line S3 is arranged at the right-hand side end. Precisely, the source line S2 is arranged striding over a boundary between the second pixel PX2 and the first pixel PX arranged on its left-hand side. The source line S3 is arranged striding over a boundary between the second pixel PX2 and a pixel adjoining the second pixel on its right-hand side.

Moreover, the gate line G1 is arranged along an upper end of the first pixel PX1 and the second pixel PX2, and the gate line G2 is arranged at a bottom end of the first pixel PX1 and the second pixel PX2. Strictly, the gate line G1 is arranged striding over a boundary between pixels adjoining the first pixel PX1 and the second pixel PX2 on its upper side, and the gate line G2 is arranged striding over a boundary between pixels adjoining the first pixel PX1 and the second pixel PX2 on its bottom side.

The auxiliary capacitance line C1 is arranged between the gate line G1 and the gate line G2 adjacent to the gate line G2 and extends in the first direction X. Further, the auxiliary capacitance line C1 is branched along the source line S1 and the source line S3, and extends toward the gate line G1.

In addition, in this embodiment, the auxiliary capacitance line C is used also as a shading layer which shades the boundary between the pixels PX. By preparing the shading layer in the array substrate 10, it is avoidable that an aperture ratio falls due to assembling shift when pasting the counter substrate CT and the array substrate 10 together. Moreover, influence of electric field leak from the source lines arranged on the auxiliary capacitance line C to alignment of liquid crystal molecules can be suppressed by impressing the same voltage as the common electrode CE to the auxiliary capacitance line C.

The switching element SW switches an electrical connection between the source line S arranged on one side of the pixel electrode PE and the pixel electrode PE in the first direction X. The switching element SW is equipped with a gate electrode EG, a source electrode ES, a drain electrode ED, and a semiconductor layer PS. The gate electrode EG is electrically connected with a corresponding gate line G (or integrally formed). The source electrode ES is electrically connected with a corresponding source line S (or formed integrally). The drain electrode ED is electrically connected with a corresponding pixel electrode PE (or formed integrally). One end of the semiconductor layer PS is electrically connected with the source line S, and the other end thereof is electrically connected with the pixel electrode PE. Further, the semiconductor layer PS counters the gate electrode EG through a gate insulating film (not shown) between one end and the other end. In the illustrated example, the semiconductor layer PS counters the gate electrode EG through the gate insulating film at two portions.

The switching element SW of the first pixel PX1 is electrically connected with the gate line G2 and the source line S1 in the illustrated example. The switching element SW is formed near an intersection of the gate line G2 with the source line S1.

The source electrode ES of the switching element SW is electrically connected with the source line S1 (or integrally formed), and connected with the semiconductor layer PS in a contact hole CH3 on an adjacent pixel side beyond the gate line G2.

The gate electrode EG of the switching element SW is electrically connected with the gate line G2 (or formed integrally), and counters the semiconductor layer PS at two portions extending in the second direction Y. That is, the switching element SW is a double gated switching element.

In the switching element SW of the first pixel PX1, one end of the semiconductor layer PS, which is electrically connected with the pixel electrode PE, extends along with the source line S1 and also extends under a branched auxiliary capacitance line C1. The semiconductor layer PS is arranged so as to overlap with the auxiliary capacitance line C1 extending to near the gate line G1.

The semiconductor layer PS is electrically connected with a contact electrode EC in a contact hole CH1 formed near the gate line G2. The contact electrode EC is electrically connected with the pixel electrode PE in a contact hole CH2 formed near the gate line G2.

The switching element SW of the second pixel PX2 is electrically connected with the gate line G2 and the source line S2 in the illustrated example. The switching element SW is formed in an intersection of the gate line G2 with the source line S2.

The source electrode ES of the switching element SW is electrically connected with the source line S2 (or integrally formed), and connected with the semiconductor layer PS in a contact hole on an adjacent pixel side beyond the gate line G2.

In the switching element SW of the second pixel PX2, one end of the semiconductor layer PS, which is electrically connected with the pixel electrode PE, extends along with the source line S3 and also extends under the branched auxiliary capacitance line C1. The semiconductor layer PS is arranged so as to overlap with the auxiliary capacitance line C1 extending to near the gate line G1.

The semiconductor layer PS is electrically connected with a contact electrode EC in the contact hole CH1 formed near the gate line G2. The contact electrode EC is electrically connected with the pixel electrode PE in the contact hole CH2 formed near the gate line G2.

The switching element SW is formed in a region which overlaps with the source line S and the main pixel electrode PA, and controls reduction of a region of an aperture portion which contributes to a display.

The pixel electrode PE is equipped with a main pixel electrode PA and a contact portion PC electrically connected mutually. The main pixel electrode PA linearly extends along the second direction Y from the contact portion PC to near the upper end of the pixel PX. The main pixel electrode PA is formed in the shape of a belt with a uniform width along the first direction X.

The contact portion PC is electrically connected with a contact electrode EC and the semiconductor layer PS of the switching element SW in the contact holes CH1 and CH2. The contact portion PC is formed more broadly than the main pixel electrode PA.

In this embodiment, the main pixel electrode PA of the first pixel electrode PE1 is arranged along the second direction Y near the source line S1 connected with the switching element SW of the first pixel PX1. The main pixel electrode PA of the second pixel electrode PE2 is arranged along the second direction Y near the source line S3 which is not connected with the switching element SW of the second pixel PX2.

That is, the main pixel electrode PA of the first pixel electrode PE1 is arranged along the source line S1 on one side of the first direction X, and the main pixel electrode PA of the second pixel electrode PE2 is arranged along the source line S3 on the other side of the first direction X.

That is, on both sides of the source line S1 in the first direction X, the main pixel electrode PA on a left-hand side pixel and the main pixel electrode PA of the first pixel PX1 on the right-hand side extend in the second direction Y, respectively. The main pixel electrode PA is not arranged on both sides of the source line S2 in the first direction X. On the both sides of the source line S3 in the first direction X, the main pixel electrode PA of the second pixel PX2 on the left-hand side and the main pixel electrode PA on the right-hand side pixel extend in the second direction Y, respectively.

The shield layer SLD is arranged so that the shield layer SLD may counter with the source line S2 while facing the gate lines G1 and G2. Namely, the shield layer SLD counters the source line S2 in which the main pixel electrodes PA are not arranged on the both sides thereof, and the gate lines G1 and G2. The shield layers SLD is set to the same potential as the common electrode CE.

The common electrode CE is equipped with the main common electrode CA. In the X-Y plane, the main common electrode CA is arranged between the main pixel electrodes PA with a predetermined gap, and extends in the second direction Y in parallel with the main pixel electrode PA. That is, while the main common electrode CA counters with the source line S in which the main pixel electrodes PA are not arranged on the both sides, the main common electrode CA extends substantially in parallel with the main pixel electrode PA in the X-Y plane. The main common electrode CA is formed in the shape of a belt with a uniform width along the first direction X.

In this embodiment, the main common electrode CA is arranged striding over a boundary between the first pixel PX1 and the second pixel PX2. The main common electrode CA counters with the source line S2. In the active area or out of the active area, the main common electrode CA is electrically connected with other main common electrodes each other.

In the first pixel PX1, the main common electrode CA is arranged at the right-hand side end. Strictly, the main common electrode CA is arranged striding over a boundary between the first pixel PX1 and the second pixel PX2 adjoining on its right-hand side.

If its attention is paid to a positional relationship between the pixel electrode PE and the main common electrode CA of the first pixel PX1, the main pixel electrode PA is arranged at the left-hand side end of the first pixel PX1, and the main common electrode CA is arranged at the right-hand side end of the first pixel PX1. The main pixel electrode PA and the main common electrode CA are arranged substantially in parallel each other. At this time, the main common electrode CA does not overlap with the pixel electrode PE in the X-Y plane.

In the second pixel PX2, the main common electrode CA is arranged at the left-hand side end. Strictly, the main common electrode CA is arranged striding over a boundary between the first pixel PX2 and the first pixel PX1 adjoining on its left-hand side.

If its attention is paid to a positional relationship between the pixel electrode PE and the main common electrode CA of the second pixel PX2, the main pixel electrode PA is arranged at the right-hand side end of the second pixel PX2, and the main common electrode CA is arranged at the left-hand side end of the second pixel PX2. The main pixel electrode PA and the main common electrode CA are arranged substantially in parallel each other. At this time, the main common electrode CA does not overlap with the pixel electrode PE in the X-Y plane.

That is, one main common electrode CA is located between the adjoining main pixel electrodes PA of the first pixel PX1 and second pixel electrode PX2. The main pixel electrodes PA of the first pixel PX1 and the second pixel PX2 are arranged sandwiching the main common electrode CA. For this reason, the main pixel electrode PA of the first pixel PX1, the main common electrode CA, and the main pixel electrode PA of the second pixel PX2 are arranged from the left side to the right side along the first direction X in this order.

The respective intervals in the first direction X between the main pixel electrodes PA and the main common electrode CA are substantially uniform. That is, the interval between the main common electrode CA and the main pixel electrode PA of the first pixel PX1 is substantially the same as the interval between the main common electrode CA and the main pixel electrode PA of the second pixel PX2 in the first direction X.

In this embodiment, a shield layer CSL is arranged facing the source lines S1 and S3. The shield layer CSL is arranged facing the source line S in which the main pixel electrodes PA are arranged on the both sides thereof in the first direction X. The shield layer CSL is arranged in the same layer as the common electrode CE and simultaneously formed with the same material as the common electrode CE.

Figure 3:
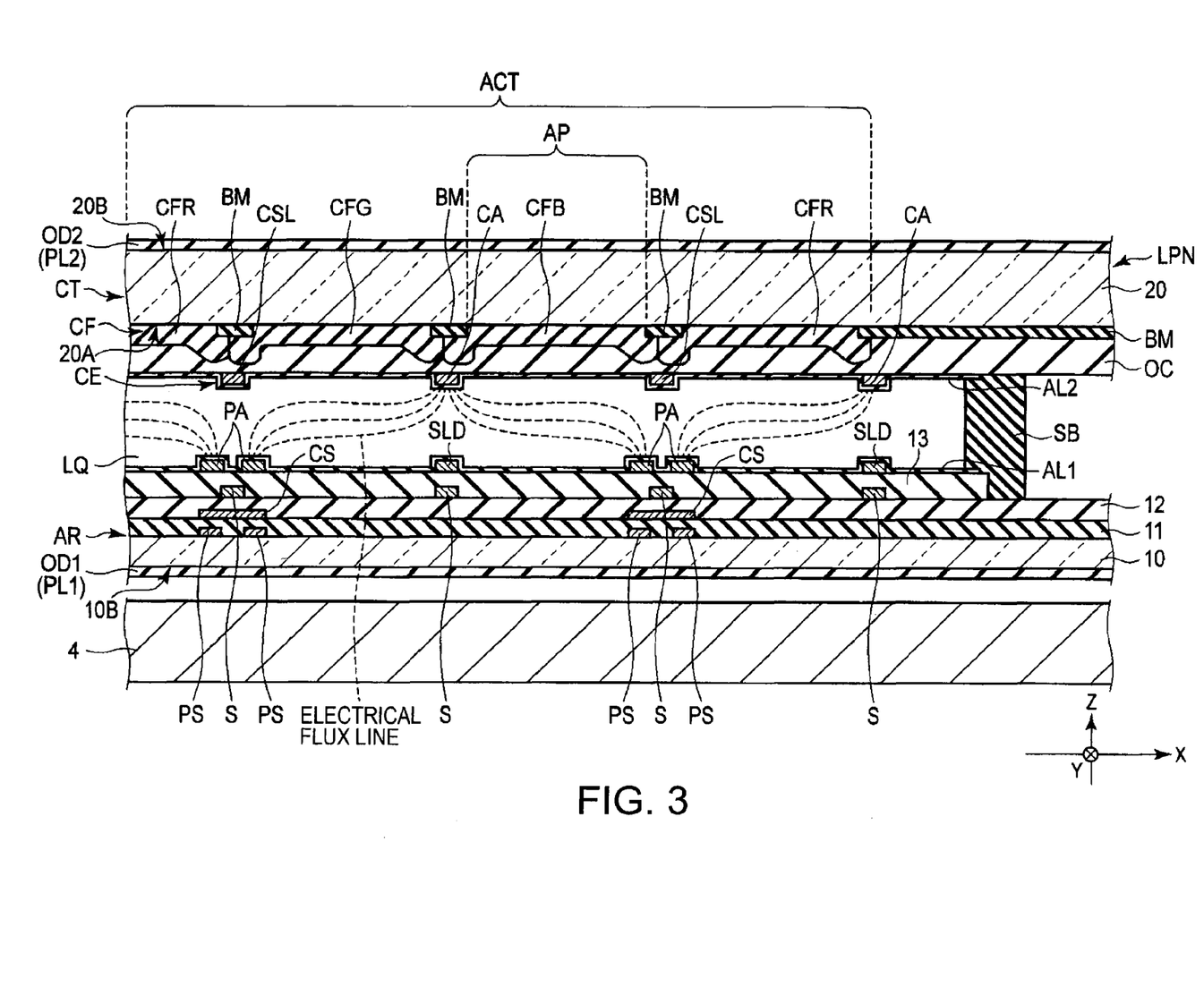
FIG. 3 is a cross-sectional view schematically showing the structure of the liquid crystal display panel taken along line shown in FIG. 2A.

FIG. 3 is a cross-sectional view schematically showing the structure of the liquid crystal display panel taken along line shown in FIG. 2A. In addition, only the part required for explanation is illustrated here.

A backlight 4 is arranged on the back side of the array substrate AR. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a light transmissive characteristics. The semiconductor layer PS of the switching element SW is formed on the first insulating substrate 10 and covered with the gate insulating film 11. The auxiliary capacitance line C is formed on the gate insulating film 11 and covered with the first interlayer insulating film 12. The source line S is formed on the first interlayer insulating film 12 and covered with a second interlayer insulating film 13. Auxiliary capacitance CS is formed in a region in which the semiconductor layer PS and the auxiliary capacitance line C counter through the gate insulating film 11.

In addition, the gate line formed in the same layer as the auxiliary capacitance line C, which is not illustrated, is arranged between the gate insulating film 11 and the first interlayer insulating film 12, for example. The contact electrode EC formed in the same layer as the source line S is arranged, for example, between the first interlayer insulating film 12 and the second interlayer insulating film 13.

The pixel electrode PE and the shield layer SLD are formed on the second interlayer insulating film 13. The pixel electrode PE is located on an inner side rather than respective positions right above adjoining source lines S. The shield layer SLD counters with the source line S.

The first alignment film AM is arranged on the array substrate AR facing the counter substrate CT, and extends to whole active area ACT. The first alignment film AL1 covers the pixel electrode PE, etc., and is also arranged on the third insulating film 13. The first alignment film AM is formed of material which shows a horizontal alignment characteristics.

In addition, the array substrate AR may be equipped with a portion of the common electrode CE.

The counter substrate CT is formed using a second insulating substrate 20 which has a transmissive characteristics. The counter substrate CT includes a black matrix BM, a color filter CF, an overcoat layer OC, the common electrode CE, the shield layer CSL and a second alignment film AL2, etc.

The black matrix BM forms an aperture portion AP by defining each pixel PX. That is, the black matrix BM is arranged so that wiring portions, such as the source line S, the gate line G, the auxiliary capacitance line C1, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in the adjoining pixels PX in the first direction X differ mutually. For example, the color filters CF are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjoining color filters CF is located in a position which overlaps with the black matrix BM. The overcoat layer OC covers the color filter CF.

The overcoat layer OC covers the color filter CF. The overcoat layer OC eases influence by unevenness of the surface of the color filter CF. For example, the overcoat layer OC is formed of a transparent resin.

The main common electrode CE and the shield layer CSL are formed on the overcoat layer OC facing the array substrate AR. The distance between the common electrode CE and the pixel electrode PE along a third direction Z is uniform. The third direction Z is a direction which crosses the first direction X and the second direction Y, i.e., a normal line direction of the liquid crystal display panel LPN.

In addition, it can be suppressed that the adjoining pixels PX in the first direction X are affected by the electric field each other by arranging the shield layer CSL so as to face the source line S sandwiched with the main pixel electrodes PA. Thereby the display grace can be improved. The shield layer may be omitted depending on the design.

The second alignment film L2 is arranged on the counter substrate CT facing the array substrate AR and extends to whole active area ACT. The second alignment film L2 covers the main common electrode CE and the overcoat layer OC, etc. The second alignment film L2 is formed of the material which shows horizontal alignment characteristics.

Figure 2B:
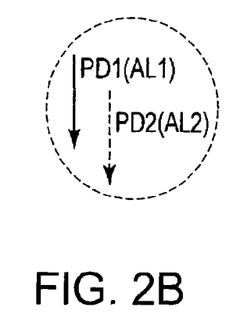
FIG. 2B is a view showing an alignment treatment direction.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with a second alignment treatment direction PD2 in which the second alignment film AL2 initially aligns the molecules. For example, in FIG. 2B, the first alignment treatment direction PD1 and the second alignment treatment direction PD2 are in parallel with the second direction Y and the same directions each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap is formed. The array substrate AR and the counter substrate CT are pasted together by seal material SB arranged outside the active area ACT while the predetermined cell gap is formed.

The liquid crystal layer LQ is held at the cell gap formed between the array substrate AR and the counter substrate CT and arranged between the first alignment film AL1 and the second alignment film AL2. The liquid crystal layer LQ contains liquid crystal molecules. The liquid crystal layer LQ is constituted by liquid crystal material having positive dielectric anisotropy (positive type).

A first optical element OD1 is attached on an external surface 10B of the array substrate AR, i.e., the external surface 10B of the first insulating substrate 10 which constitutes the array substrate AR, by adhesives, etc. The first optical element OD1 is located on a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis (or first absorption axis) AX1.

A second optical element OD2 is attached on an external surface of the counter substrate CT, i.e., the external surface 20B of the second insulating substrate 20 which constitutes the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2.

The first polarizing axis AX1 of the first polarization plate PL1 and the second polarizing axis AX2 of the second polarization plate PL2 are arranged in the positional relationship of Cross Nicol. In this state, one polarization plate is arranged so that the polarizing axis becomes in parallel with or orthogonally crosses the initial alignment direction, i.e., the first treatment direction PD1 or the second treatment direction PD2. That is, when the initial alignment direction is in parallel to the second direction Y, the polarizing axis of the one polarization plate is substantially in parallel with the second direction Y or orthogonally crosses the first direction X.

Figure 2C:
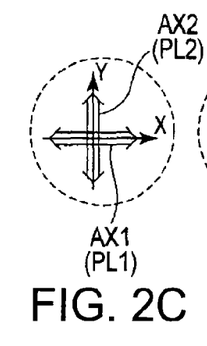
FIGS. 2C and 2D are views showing polarizing axis directions of polarization plates.
Figure 2D:
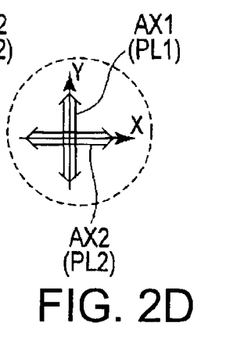

In FIG. 2C, the first polarization plate PL1 is arranged so that the first polarizing axis AX1 orthogonally crosses the initial alignment direction of the liquid crystal material LM (the second direction Y), i.e., in parallel with the first direction X. The second polarization plate PL2 is arranged so that the second polarizing axis AX2 becomes in parallel with the initial alignment direction of the liquid crystal material LM (second direction Y).

In FIG. 2C, the second polarization plate PL2 is arranged so that the second polarizing axis AX2 orthogonally crosses the initial alignment direction of the liquid crystal material LM (the second direction Y), i.e., in parallel with the first direction X. The first polarization plate PL1 is arranged so that the first polarizing axis AX1 becomes in parallel with the initial alignment direction of the liquid crystal material LM (second direction Y).

Next, the operation the liquid crystal display panel LPN mentioned above is explained referring to the figure.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment direction PD1 of the first alignment film AL1 and the second alignment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane and explained as what rotates in a field in parallel with the X-Y plane.

Here, both of the first alignment treatment direction PD1 of the first alignment film AM and the second alignment treatment direction PD2 of the second alignment film AL2 are directions in parallel to the second direction Y. At the time of OFF, the long axis of the liquid crystal molecule LM is aligned substantially in parallel to the second direction Y as shown with the dashed line in FIG. 2A. That is, the direction of the initial alignment of the liquid crystal molecule LM is in parallel to the second direction Y or makes an angle 0° with the second direction Y.

When the respective first alignment treatment direction PD1 and second alignment treatment direction PD2 are in parallel and the same directions each other as shown in the figure, the liquid crystal molecule LM is aligned with an approximately horizontal direction (i.e., the pre tilt angle is approximately zero) in a cross-section of the liquid crystal layer LQ in the intermediate portion of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

Here, the liquid crystal molecule LM near the first alignment direction AL1 is aligned to the first alignment treatment direction PD1 by carrying out the alignment treatment of the first alignment AL1 in the first alignment treatment direction PD1. Similarly, the liquid crystal molecule LM near the second alignment direction AL2 is aligned to the second alignment treatment direction PD2 by carrying out the alignment treatment of the second alignment AL2 in the second alignment treatment direction PD2. When the respective first alignment treatment direction PD1 and second alignment treatment direction PD2 are in parallel and the same directions each other as shown in the figure, the liquid crystal molecule LM is aligned in the splay alignment state. The alignment of the liquid crystal molecule LM near the first alignment film AL1 on the array substrate AR and the second alignment film AL2 on the counter substrate CT becomes symmetrical with respect to the intermediate portion of the liquid crystal layer LQ. Thus, in the splay alignment state, the display is optically compensated even in an inclining direction from the normal line of the substrate by the liquid crystal molecules LM near the first alignment film AM and the second alignment film AL2. Therefore, when the respective first alignment treatment direction PD1 and second alignment treatment direction PD2 are in parallel and the same directions each other, there are few optical leaks in a black display. Accordingly, a high contrast ratio can be realized, and it becomes possible to improve display grace.

In addition, when both of the first and second alignment treatment directions PD1 and PD2 are in parallel and opposite directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment).

A portion of the backlight from the backlight 4 penetrates the first polarizing plate PL1, and enters into the liquid crystal display panel LPN. The polarized state of the incident light to the liquid crystal display panel LPN depends on the alignment state of the liquid crystal molecule LM when passing the liquid crystal layer LQ. At the time OFF, the polarized light which penetrates the liquid crystal display panel LPN is absorbed by the second polarization plate PL2 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the embodiment shown in FIG. 2A, in the region between the pixel electrode PE2 and the main common electrode CA, the liquid crystal molecule LM rotates clockwise to the second direction Y, and aligns so that it may turn to the lower left in the figure. In the region between the main pixel electrode PE1 and the main common electrode CA, the liquid crystal molecule LM rotates counterclockwise to the second direction Y, and aligns so that it may turn to the lower right in the figure.

At the time of ON, a portion of the backlight which entered in the liquid crystal panel LPN from the backlight 4 penetrates the first polarization plate PL1 and passes the liquid crystal panel LPN. The polarized state of the backlight which entered in the liquid crystal layer LQ changes. At the time of ON, at least a portion of the backlight which passes the liquid crystal layer LQ penetrates the second polarization plate PL2 (white display).

At the time OFF, the liquid crystal molecule LM is initially aligned substantially in the second direction Y. In the ON state when potential difference is formed between the pixel electrode PE and the common electrode CE, the optical modulation rate of the liquid crystal layer LQ becomes the highest, that is, the transmissivity in the aperture AP becomes the largest when director of the liquid crystal molecule LM (or the direction of the long axis of the liquid crystal molecule LM) within the X-Y plane is shifted by approximately 45° with respect to the first polarization axis AX1 of the first polarization plate PL1 and the second polarization axis AX2 of the second polarization plate PL2.

In the ON state, the director of the liquid crystal molecule LM between the main common electrode CA and the pixel electrode PE of the second pixel PX2 becomes substantially in parallel with a direction of 45°–225° in the X-Y plane, and the director of the liquid crystal molecule LM between the main common electrode CA and the first pixel electrode PE becomes substantially in parallel with a direction of 135°–315° in the X-Y plane. At this time, peak transmissivity is obtained. If its attention is paid to a transmissivity distribution in each pixel PX, while transmissivity becomes substantially zero on the pixel electrode PE and the common electrode CE, high transmissivity is obtained in the whole electrode gap between the pixel electrode PE and the common electrode CE.

In the operation of the above liquid crystal display panel LPN, the alignment of liquid crystal molecules may be dispersed under influence of potential impressed to the source line S and the gate line G. When the pixel electrode PE is arranged especially in parallel with the source line S, the alignment of the liquid crystal molecules determined by the potential of the pixel electrode PE and the common electrode CE is dispersed by electric field leak from the source line S, and may result in decrease in the display grace.

For example, there are some driving systems such as a 1HIV inversion driving system (Dot inversion driving system) which reverses the polarity of the pixel every row lines and column lines, and a column inversion driving system which reverses the polarity of the pixel every column lines.

In case of 1HIV inversion driving system, even if electric field leak from the source line S occurs, the response of the liquid crystal molecules to the electric field leak do not follow, and the influence of electric field leak becomes comparatively small because the polarity of the source line S is reversed every row lines. On the other hand, in the column inversion driving system, since the polarity of the source line S becomes the same in one-frame period, the number of the polarity inversion is small. Accordingly, the column inversion driving system is effective in low power consumption. However, when the frame frequency is 60 Hz, for example, and one frame time is 16.7 ms, the liquid crystal molecules respond enough by electric field leak from the source line S. Therefore, a vertical cross talk may be actualized in the liquid crystal display panel which adopts the column inversion driving system.

In order to improve the cross talk, it is also possible to arrange a shield layer having the same potential as the common electrode CE on the source line S. However, since the shield layer serves as a region which does not contribute to transmissivity, when maintaining predetermined transmissivity, it becomes difficult to arrange the shield layer of sufficient size. Then, this embodiment supplies the liquid crystal display device which realizes an improvement of the cross talk while avoiding decrease in transmissivity.

For example, in a period when the pixel potential of the first pixel PX1 and the second pixel PX2 shown in FIG. 2A is held, the polarity of the voltage impressed to the main pixel electrode PA of the first pixel PX1 is presumed as positive, the polarity of the voltage impressed to the main pixel electrode PA of the second pixel PX2 is presumed as negative, and the voltage impressed to the source line S2 is presumed as negative.

At this time, in the first pixel PX1, since the potential difference between the main pixel electrode PA and the source line S2 becomes comparatively large, the electric field produced between the main pixel electrode PA and the main common electrode CA may be affected by the electric field leak from the source line S2, and the alignment of the liquid crystal molecules may be dispersed in response to the influence of the electric field leak from the source line S2.

On the other hand, in the second pixel PX2, since the potential difference between the main pixel electrode PA and the source line S2 becomes comparatively small, the influence of electric field leak from the source line S2 to the electric field produced between the main pixel electrode PA and the main common electrode CA is suppressed, and the dispersion of the alignment of the liquid crystal molecules is avoided.

Figure 4:
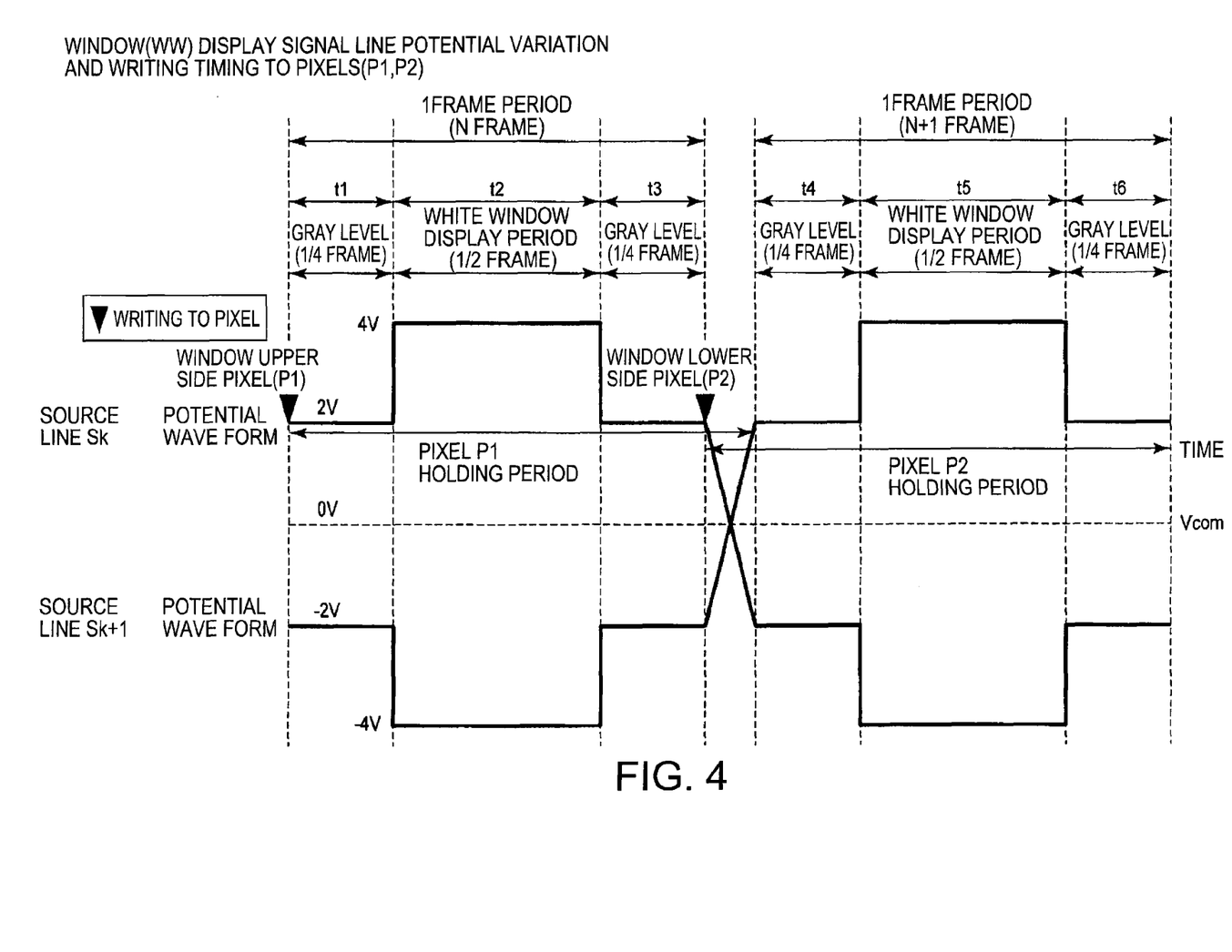
FIG. 4 is a view showing a waveform of a source line when displaying a white color window in a center of a gray level display screen.
Figure 5:
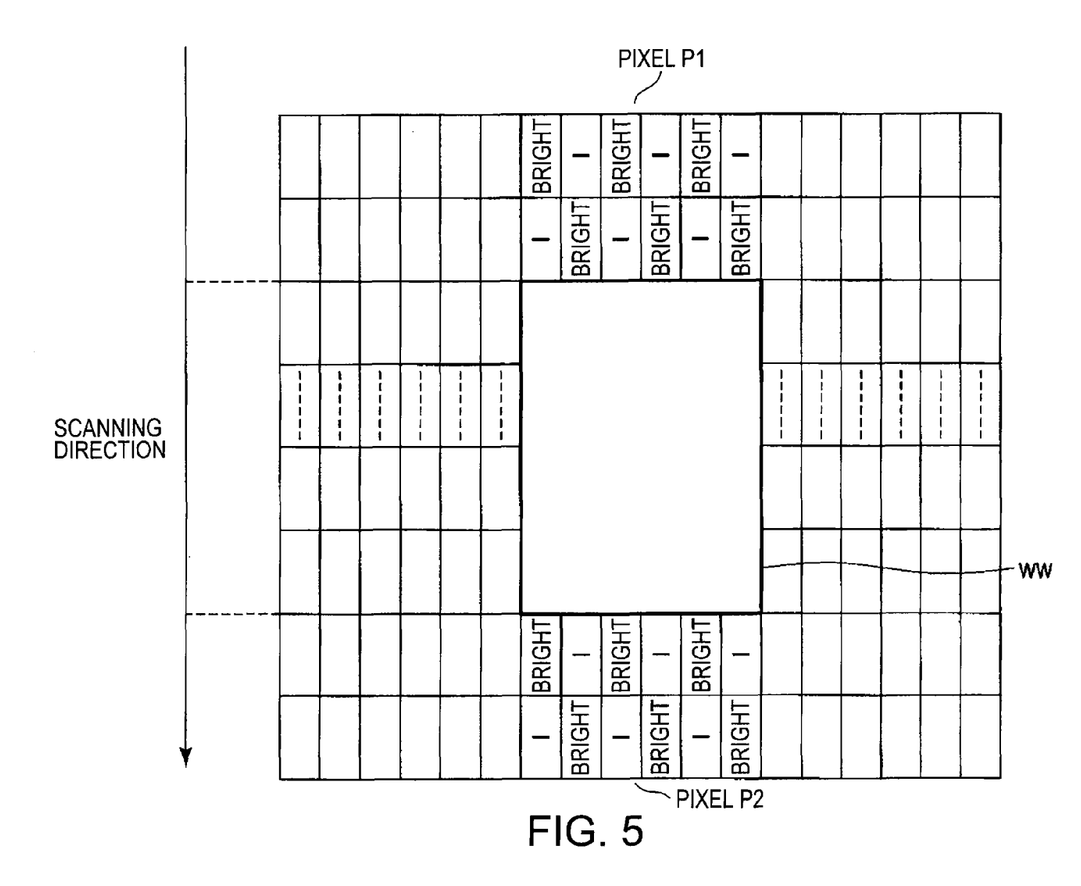
FIG. 5 is a view showing the screen when the white color window is displayed in the center of the gray level display screen.

FIG. 4 is a figure showing an example of a potential waveform of the source line, when displaying a white window WW in the center of a gray level screen. Here, in the liquid crystal display panel PNL which adopts the column reversion driving system, the potential waveforms of the two adjoining source lines S arranged in the first direction X are shown. FIG. 5 is a figure showing an example which displays the white window WW in the center of screen displaying the gray level.

In case a source line Sk and a source line Sk+1 (k is a positive integer) are arranged in the column lines crossing the white window WW, in the first period t1 of the Nth frame period, a positive voltage (for example, 2V) corresponding to the gray level is impressed to the source line Sk with respect to the common electrode potential Vcom (for example, 0V). A negative voltage (for example, −2V) corresponding to the gray level is impressed to the source line Sk+1 with respect to the common electrode potential Vcom. In the period t1, the signal corresponding to the gray level is written to the upper side pixel (pixel P1) of the white window WW.

In a successive period t2, a positive voltage (for example, 4V) corresponding to the white display is impressed to the source line Sk with respect to the common electrode potential Vcom. A negative voltage (for example, −4V) corresponding to the white display is impressed to the source line Sk+1 with respect to the common electrode potential Vcom. In the period t2, the signal corresponding to the white display is written in the white window WW.

Then, in a successive period t3, a positive voltage (for example, 2V) corresponding to the gray level is impressed to the source line Sk with respect to the common electrode potential Vcom. A negative voltage (for example, −2V) corresponding to the gray level is impressed to the source line Sk+1 with respect to the common electrode potential Vcom. In the period t3, the signal corresponding to the gray level is written to the lower side pixel (pixel P2) of the white window WW.

Next, in the (N+1)st frame period, the polarity of the voltage impressed to the source line Sk and the voltage impressed to the source line Sk+1 becomes reverse each other. Namely, in the period t4 of the beginning of the (N+1)st frame period, a negative voltage (for example, −2V) corresponding to the gray level is impressed to the source line Sk with respect to the common electrode potential Vcom. A positive voltage (for example, 2V) corresponding to the gray level is impressed to the source line Sk+1 with respect to the common electrode potential Vcom. In the period t4, the signal corresponding to the gray level is written to the upper side pixel (pixel P1) of the white window WW.

In a successive period t5, a negative voltage (for example, −4V) corresponding to the white display is impressed to the source line Sk with respect to the common electrode potential Vcom. A positive voltage (for example, 4V) corresponding to the white display is impressed to the source line Sk+1 with respect to the common electrode potential Vcom. In the period t5, the signal corresponding to the white display is written in the white window WW.

In a successive period t6, a negative voltage (for example, −2V) corresponding to the gray level is impressed to the source line Sk with respect to the common electrode potential Vcom. A negative voltage (for example, −2V) corresponding to the gray level is impressed to the source line Sk+1 with respect to the common electrode potential Vcom. In the period t6, the signal corresponding to the gray level is written to the lower side pixel (pixel P2) of the white window WW.

At this time, in the first pixel PX arranged between the source line Sk and the source line Sk+1, the main pixel electrode PA is arranged on the source line Sk side, and the main common electrode CA is arranged facing the source line Sk+1. The alignment of the liquid crystal molecules are controlled by the electric field between the main common electrode CA and the main pixel electrode PA.

When the first pixel PX1 is located on the upper side of the white window WW, the signal corresponding to the gray level supplied to the pixel electrode PE is the same polarity as the source line Sk, and opposite polarity to the source line Sk+1. Therefore, the potential difference between the main pixel electrode PA and the source line Sk+1 becomes comparatively large, and the electric field between the main pixel electrode PA and the main common electrode CA is affected by electric field leak from the source line Sk+1. As a result, the first pixel PX1 located on the upper side of the white window WW becomes a display which is brighter than a desired gray level.

On the other hand, the polarities of the source line Sk and the source line Sk+1 are reversed in the next frame period when the first pixel PX1 is located on the lower side of the white window WW. Accordingly, the signal corresponding to the gray level supplied to the pixel electrode PE is the same polarity as the source line Sk+1, and the period when the polarity of the signal corresponding to the gray level becomes an opposite polarity to the source line Sk becomes comparatively long. Therefore, the potential difference between the main pixel electrode PA and the source line Sk+1 becomes comparatively small, and the influence to the electric field between the main pixel electrode PA and the main common electrode CA by the electric field leak from Source line Sk+1 is suppressed. As a result, the first pixel PX1 located on the lower side of the white window WW displays a desired gray level.

Moreover, in the second pixel PX2 arranged between the source line Sk and the source line Sk+1, the main pixel electrode PA is arranged on the source line Sk+1 side, and the main common electrode CA is arranged facing the source line Sk. The alignment of the liquid crystal molecules are controlled by the electric field between the main common electrode CA and the main pixel electrode PA.

When the second pixel PX2 is located on the upper side of the white window WW, the signal corresponding to the gray level supplied to the pixel electrode PE is the same polarity as the source line Sk, and opposite polarity to the source line Sk+1. Therefore, the potential difference between the main pixel electrode PA and the source line Sk becomes comparatively small, and the influence to the electric field between the main pixel electrode PA and the main common electrode CA by the electric field leak from the source line Sk is suppressed. As a result, the second pixel PX2 located on the lower side of the white window WW displays a desired gray level.

On the other hand, when the first pixel PX1 is located on the lower side of the white window WW, since the polarity of the source line Sk and the source line Sk+1 is reversed in the next frame period, the signal corresponding to the gray level supplied to the pixel electrode PE is the same polarity as the source line Sk+1, and the period when the polarity of the pixel electrode PE is opposite to that of the source line Sk becomes comparatively long. Therefore, the potential difference between the main pixel electrode PA and the source line Sk becomes comparatively large, and electric field between the main pixel electrode PA and the main common electrode CA is affected by electric field leak from the source line Sk. As a result, the display of the second pixel PX1 located on the lower side of the white window WW becomes brighter than the desired gray level.

In addition, the voltage corresponding to the gray level display of a fixed level is impressed to the source lines S which are arranged outside of the white window WW in the central portion in the second direction Y, and the polarity is reversed every frames. In the pixels arranged in the source lines S, neither the potential difference between the main pixel electrode PA and the source line S becomes large, nor the alignment dispersion of the liquid crystal molecules becomes remarkable comparing with the source lines S which cross the white window WW.

In each pixel PX, generating of the cross talk can be controlled by eliminating the alignment dispersion of the liquid crystal molecules. That is, the location of the main pixel electrode PA is determined so that the potential difference between the main pixel electrodes PA located in the both ends of the aperture AP in the first direction X and the source line S becomes small to eliminate the alignment dispersion. Moreover, since the influence of electric field leak from the source line S becomes small, it is not necessary to enlarge the shield layer SLD, and decrease in the aperture ratio can be also avoided.

In addition, since the main pixel electrode PA is arranged on the source line S in which the shield layer SLD is not arranged, the electric field leak from the source line S can be shielded with the main pixel electrode PA.

Figure 6:
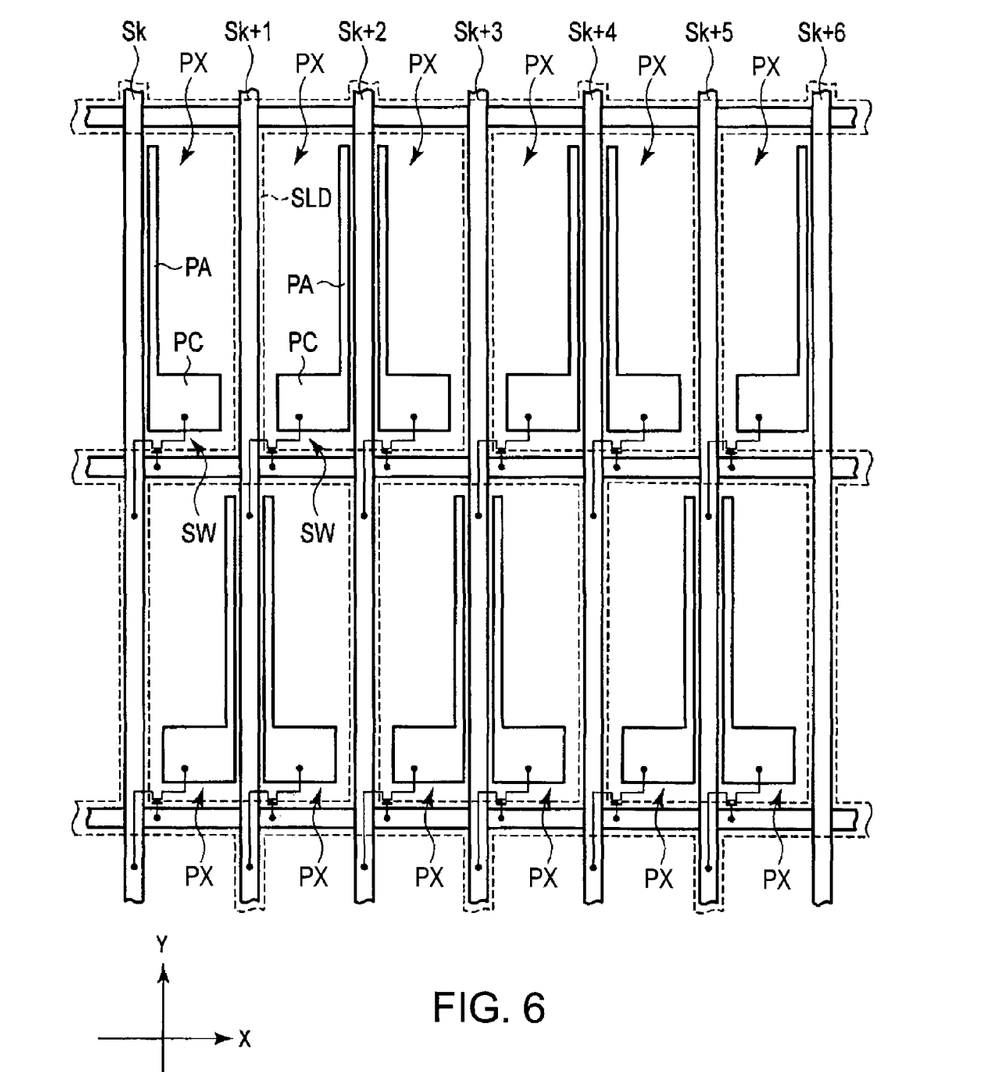
FIG. 6 is a plan view schematically showing an arrangement of the pixels in an active area according to a second embodiment.
Figure 7:
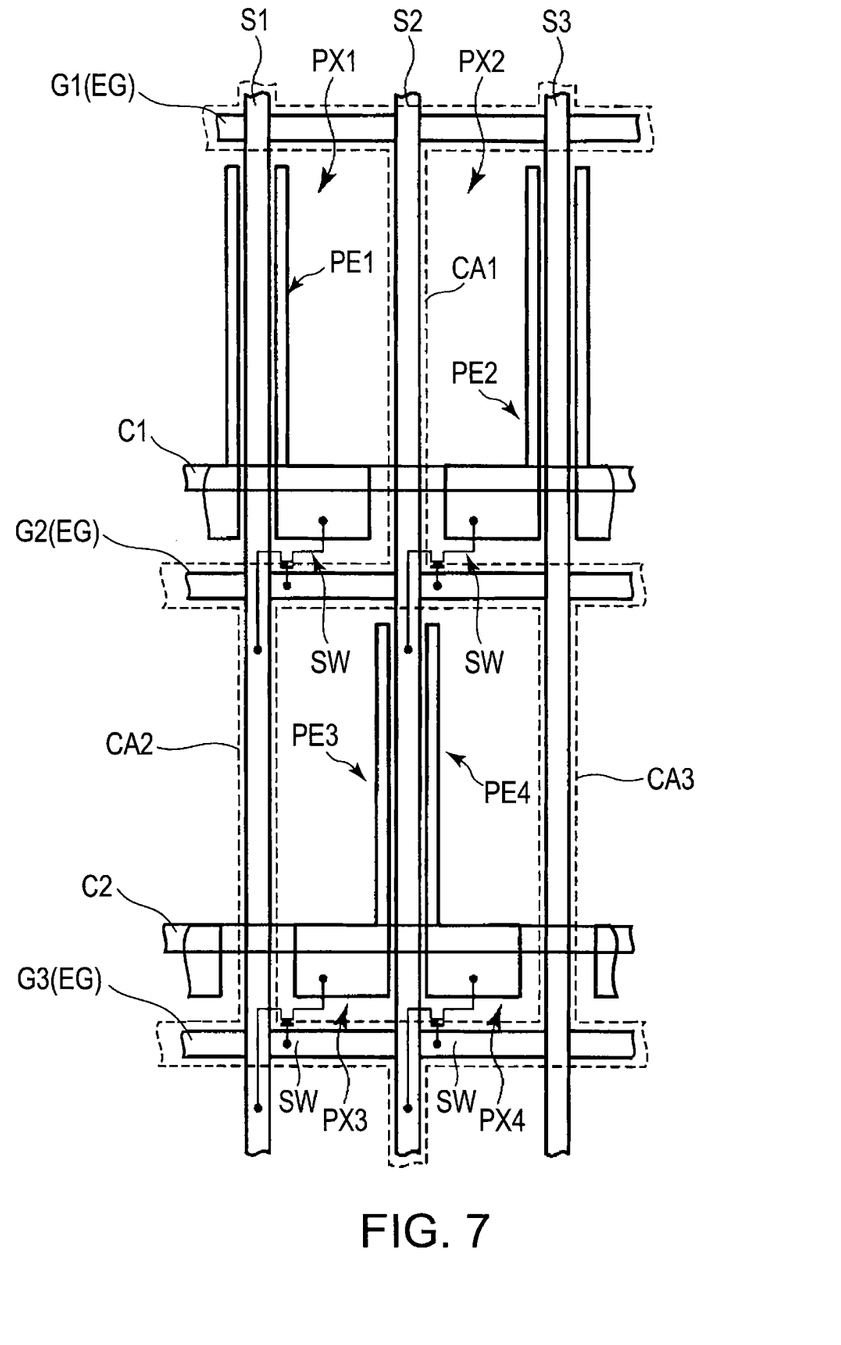
FIG. 7 is a plan view schematically showing an arrangement of four pixels shown in FIG. 6 in more detail.

FIG. 6 is a figure showing an example of arrangement of the pixels PX in the active area ACT according to a second embodiment. In addition, in FIG. 6, only the structure required for explanation is shown schematically, and other structures are omitted. FIG. 7 is a plan view schematically showing the arrangement of four pixels shown in FIG. 6 in more detail.

As mentioned above, the magnitude of the potential difference between the main pixel electrode PA and the source line S in each pixel PX changes depending on the position of the pixel PX in the active area ACT in the scanning direction and displayed pictures. So, in this second embodiment, the first pixel PX1 and the second pixel PX2 are arranged side by side along the first direction X by turns as shown in FIG. 7. Similarly, the third pixel PX3 having the same pattern as the second pixel PX2 and the fourth pixel PX4 having the same pattern as the first pixel PX1 are arranged side by side along the first direction X by turns. The first pixel PX1 and a third pixel PX3 is arranged side by side along the second direction Y by turns. Similarly, the second pixel PX2 and a fourth pixel PX4 is arranged side by side along the second direction Y by turns in the active area ACT.

In FIG. 7, a first gate line G1, a second gate line G2 and a third gate line G3 extend in the first direction X. A first source line S1, a second source line S2 and a third source line S3 respectively extend in the second direction Y. A first pixel electrode PE1 is arranged adjacent to the first source line S1 extending in the second direction Y between the first gate line G1 and the second gate line G2. A second main pixel electrode PE2 is arranged adjacent to the third source line S3 extending in the second direction Y between the first gate line G1 and the second gate line G2. A third main pixel electrode PE3 is arranged adjacent to the second source line S2 facing the first source line S1 and extending in the second direction Y between the second gate line G2 and the third gate line G3. A fourth main pixel electrode PE4 is arranged adjacent to the second source line S2 facing the third source line S3 and extending in the second direction Y between the second gate line G2 and the third gate line G3. The third main pixel electrode PE3 and the fourth main pixel electrode PE4 are arranged adjacent each other sandwiching the second source line S2.

In the second substrate, a first common electrode CA1 is arranged above the second source line S2 extending in the second direction Y between the first source line S1 and the third source line S3, and between the first gate line G1 and the second gate line G2. A second common electrode CA2 is arranged above the first source line S1 extending in the second direction Y between the second gate line G2 and the third gate line G3. A third common electrode CA3 is arranged above the third source line S3 extending in the second direction Y between the second gate line G2 and the third gate line G3. The first, second, and third common electrodes CA1, CA2, CA3 are connected each other. The first pixel PX1 is formed of the first and second source lines S1, S2, the first and second gate lines G1, G2, and the first pixel electrode PE1. The second pixel is formed of the second and third source lines S2, S3, the first and second gate lines G1, G2, and the second pixel electrode PE2. Similarly, the third pixel X3 is formed of the first and second source lines S1, S2, the second and third gate lines G2, G3, and the third pixel electrode PE3. A fourth pixel PX4 is formed of the second and the third source lines S2, S3, the second and third gate lines G2, G3 and the fourth pixel electrode PE4.

The first substrate includes switching elements for switching electrical connection between the first source line S1 and the first pixel electrode PE1, between the second source line S2 and the second pixel electrode PE2, between the first source line S1 and the third pixel electrode, PE3 and between the second source line S2 and the fourth pixel electrode PE4.

A first auxiliary capacitance line C1 extends substantially in the first direction X and branching along the first pixel electrode PE1 and the first source line S1 so as to face the first pixel electrode PE1 and the first source line S1, and along the second pixel electrode PE2 and the third source line S3 so as to face the second pixel electrode PE2 and the third source line S3. A second auxiliary capacitance line C2 extends substantially in the first direction X and branching along the third and fourth pixel electrodes PE3, PE4 and the second source line S2 so as to face the third and fourth pixel electrodes PE3, PE4 and the second source line S2. The respective switching elements include a semiconductor layer extending along the auxiliary capacitance lines so as to overlap through an insulating layer like the first embodiment shown in FIG. 2A.

The first substrate includes first shield layers SLD arranged on the second source line S2 between the first gate line G1 and the second gate line G2, and on the first and third source lines S1, S3 between the second gate line G2 and the third gate line G3 like the first embodiment shown in FIG. 2A.

The second substrate includes second shield layers CSL arranged on the first and third source lines S1, S3 between the first gate line G1 and the second gate line G2, and on the second source line S2 between the second gate line G2 and the third gate line G3 like the first embodiment shown in FIG. 2A.

Accordingly, by arranging the pixels PX as above, even if it is a case where the pixels PX are located on the upper side and the lower side of the white window WW shown in FIG. 5, the pixel displaying brightly (pixel indicated with "bright") is either one of adjoining pixels, and the other is a pixel (pixel indicated with "-") displaying a desired picture. Furthermore, since the pixel in which the alignment of the liquid crystal molecules is dispersed, and the pixel displaying the desired picture are arranged by turns along the first direction X and the second direction Y, neither a bright line nor a dark line is sighted, and degradation of display grace is controlled.

According to this embodiment, while controlling decrease in transmissivity, it becomes possible to avoid generating of the cross talk. Thereby, it becomes possible to control degradation of display grace.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CA in order to make transmissivity of each pixel high enough.

In addition, in the product specifications in which the pixel pitch differs each other, it becomes possible to use a peak condition of the transmissivity distribution by changing the inter-electrode distance. That is, in the display mode according to this embodiment, it becomes possible to supply the display device having various pixel pitches by setting up inter-electrode distance between the main pixel electrode and main common electrode corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, according to this embodiment, the transmissivity fully falls in the region which overlaps with the black matrix BM. This is because the electric field leak does not occur outside of the pixel from the common electrode CE, and undesired lateral electric field is not produced between the adjoining pixels on the both sides of the black matrix BM. That is, it is because the liquid crystal molecule in the region which overlaps with the black matrix BM maintains the state of the initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE and the pixel electrode PE in the lateral direction. However, the alignment shift is produced in common to all the first pixels PX and all the second pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the colors of the color filters differ between the adjoining pixels, it becomes possible to control generating of mixed colors, and also becomes possible to control the fall of color reproducibility and the contrast ratio.

In this embodiment, the main common electrodes CA counter with the source lines S, respectively. In the case where the main common electrodes CA are arranged above the source lines S, respectively, the aperture portion AP which contributes to the display can be expanded as compared with the case where the main common electrodes CA are arranged on the pixel electrode PE side rather than above the source lines S, and it becomes possible to improve the transmissivity of the pixel PX.

Moreover, it becomes possible to expand the distance between the pixel electrode PE and the main common electrode CA in the first direction X, by arranging the main common electrodes CA above the source lines S, respectively, and also becomes possible to form more horizontal electric field closer to the horizontal direction. For this reason, it also becomes possible to maintain the wide viewing angle which is one of advantages of the general IPS mode.

In addition, in the above-mentioned example, the initial alignment direction of the liquid crystal molecule LM is in parallel with the second direction Y. However, the initial alignment direction of the liquid crystal molecule LM may be an oblique direction D which obliquely crosses the second direction Y as shown in FIG. 2A. Herein, an angle θ1 which the initial alignment direction D makes with the second direction Y is larger 0° and smaller than 45°. In addition, it is extremely effective to set the angle θ1 in the range of 5° to 30°, more preferably less than 20° in a viewpoint of the alignment control of the liquid crystal molecule LM. That is, it is preferable that the initial alignment direction of the liquid crystal molecule LM is set to a direction substantially in parallel with the direction in the range of 0° to 20° with respect to the second direction Y.

Moreover, although the above-mentioned example explains the case where the liquid crystal layer LQ has positive dielectric constant anisotropy, the liquid crystal layer LQ may have negative dielectric constant anisotropy. Although detailed explanation is omitted, when the negative type liquid crystal material is used, it is preferable that the above-mentioned angle θ1 is made in the range of 45° to 90°, and more preferably not less than 70°.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, even if the pixel electrode PE and the common electrode CE are formed of the electric conductive material with the light transmissive characteristics, the backlight hardly penetrates, and also hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), silver (Ag), and copper (Cu).

As explained above, according to the embodiment, it becomes possible to supply the liquid crystal display which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
a first substrate including:
  a first gate line and a second gate line extending in a first direction,
  a first source line, a second source line and a third source line respectively extending in a second direction orthogonally crossing the first direction and crossing the first and second gate lines,
  a single first pixel electrode arranged adjoining the first source line so as to extend along the first source line in the second direction, the distance between the first source line and the single first pixel electrode being shorter than the distance between the second source line and the single first pixel electrode, and
  a single second pixel electrode arranged adjoining the third source line so as to extend along the third source line in the second direction, the distance between the third source line and the single second pixel electrode being shorter than the distance between the second source line and the single second pixel electrode;

a second substrate including a common electrode arranged above the second source line extending in the second direction between the first source line and the third source line; and a liquid crystal layer held between the first substrate and the second substrate;

wherein the first and second source lines, the first and second gate lines, and the single first pixel electrode form a first pixel, and the second and the third source lines, the first and second gate lines, and the single second pixel electrode form a second pixel.

2. The liquid crystal display device according to claim 1, wherein
the first substrate includes:
a first switching element for switching a first electrical connection between the first source line and the single first pixel electrode, and a second switching element for switching a second electrical connection between the second source line and the single second pixel electrode,
an auxiliary capacitance line extending substantially in parallel with the first and second gate lines and branching along the single first pixel electrode and the first source line so as to face the single first pixel electrode and the first source line, and along the single second pixel electrode and the third source line so as to face the single second pixel electrode and the third source line; and
the first and second switching elements respectively each include its own semiconductor layer extending along the auxiliary capacitance line so as to overlap through an insulating layer.

3. The liquid crystal display device according to claim 1, wherein the first substrate includes a first shield layer arranged on the second source line.

4. The liquid crystal display device according to claim 1, wherein the second substrate includes a second shield layer arranged above the first and third source lines.

5. The liquid crystal display device according to claim 1, further comprising a driving circuit for driving the gate lines and the source lines, wherein the driving circuit supplies voltages having different polarities to the first and second source lines in a frame period, and reverses the polarity of the voltages supplied to the first and second source lines every frame period.

6. A liquid crystal display device, comprising:
a first substrate including:
a first gate line, a second gate line and a third gate line extending in a first direction and arranged in a second direction orthogonally crossing the first direction in this order,
a first source line, a second source line and a third source line respectively extending in the second direction and arranged in the first direction in this order,
a single first pixel electrode arranged adjoining the first source line so as to extend along the first source line in the second direction between the first gate line and the second gate line, the distance between the first source line and the single first pixel electrode being shorter than the distance between the second source line and the single first pixel electrode,
a single second pixel electrode arranged adjoining the third source line so as to extend along the third source line in the second direction between the first gate line and the second gate line, the distance between the third source line and the single second pixel electrode being shorter than the distance between the second source line and the single second pixel electrode, a single third pixel electrode arranged adjoining the second source line so as to extend along the second source line in the second direction, the single third pixel electrode facing the first source line between the second gate line and the third gate line, and the distance between the second source line and the single third pixel electrode being shorter than the distance between the first source line and the single third pixel electrode, and a single fourth pixel electrode arranged adjoining the second source line so as to extend along the second source line in the second direction, the single fourth pixel electrode facing the third source line between the second gate line and the third gate line, and the distance between the second source line and the single fourth pixel electrode being shorter than the distance between the third source line and the single fourth pixel electrode, wherein the single third pixel electrode and the single fourth pixel electrode are arranged adjacent each other sandwiching the second source line;

a second substrate including:
a first common electrode arranged above the second source line extending in the second direction between the first source line and the third source line, and between the first gate line and the second gate line,
a second common electrode arranged above the first source line extending in the second direction between the second gate line and the third gate line, and
a third common electrode arranged above the third source line extending in the second direction between the second gate line and the third gate line a liquid crystal layer held between the first substrate and the second substrate;

wherein a first pixel is formed of the first and second source lines, the first and second gate lines, and the single first pixel electrode, and a second pixel is formed of the second and third source lines, the first and second gate lines, and the single second pixel electrode; and wherein a third pixel is formed of the first and second source lines, the second and third gate lines, and the single third pixel electrode, and a fourth pixel is formed of the second and the third source lines, the second and third gate lines, and the single fourth pixel electrode.

7. The liquid crystal display device according to claim 6, wherein
the first substrate includes:
switching elements for switching electrical connections between the first source line and the single first pixel electrode, between the second source line and the single second pixel electrode, between the first source line and the single third pixel electrode, and between the second source line and the single fourth pixel electrode,
a first auxiliary capacitance line extending substantially in the first direction and branching along the single first pixel electrode and the first source line so as to face the single first pixel electrode and the first source line, and along the single second pixel electrode and the third source line so as to face the single second pixel electrode and the third source line,
a second auxiliary capacitance line extending substantially in the first direction and branching along the single third and fourth pixel electrodes and the second source line so as to face the single third and fourth pixel electrodes and the second source line; and the respective switching elements each include its own semiconductor layer extending along the auxiliary capacitance lines so as to overlap through an insulating layer.

8. The liquid crystal display device according to claim 6, wherein the first substrate includes first shield layers arranged on the second source line between the first gate line and the second gate line, and on the first and third source lines between the second gate line and the third gate line.

9. The liquid crystal display device according to claim 6, wherein the second substrate includes second shield layers arranged on the first and third source lines between the first gate line and the second gate line, and on the second source line between the second gate line and the third gate line.

10. The liquid crystal display device according to claim 6, further comprising a driving circuit for driving the gate lines and the source lines, wherein the driving circuit supplies voltages having different polarities to the source lines adjacent each other in the first direction in a frame period, and reverses the polarity of the voltages supplied to the source lines every frame period.

* * * * *